United States Patent
Mueller

(10) Patent No.: US 10,252,582 B2
(45) Date of Patent: Apr. 9, 2019

(54) TYRE IN TYRE SYSTEMS

(71) Applicant: AGCO International GmbH, Neuhausen (CH)

(72) Inventor: Thomas Mueller, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/759,293

(22) PCT Filed: Sep. 8, 2016

(86) PCT No.: PCT/EP2016/071166
§ 371 (c)(1),
(2) Date: Mar. 12, 2018

(87) PCT Pub. No.: WO2017/042263
PCT Pub. Date: Mar. 16, 2017

(65) Prior Publication Data
US 2018/0250990 A1    Sep. 6, 2018

(30) Foreign Application Priority Data

Sep. 10, 2015    (GB) .................................. 1516024.5

(51) Int. Cl.
*B60C 23/00* (2006.01)
*B60C 23/06* (2006.01)
(Continued)

(52) U.S. Cl.
CPC .............. *B60C 23/004* (2013.01); *B60C 5/22* (2013.01); *B60C 23/064* (2013.01);
(Continued)

(58) Field of Classification Search
CPC ........ B60C 23/004; B60C 23/064; B60C 5/22; B60C 29/007
(Continued)

(56) References Cited

U.S. PATENT DOCUMENTS 7,219,540 B2    5/2007  Nordhoff
10,017,010 B2 * 7/2018  Bowman .................. B60C 5/22
(Continued)

FOREIGN PATENT DOCUMENTS

EP    1 607 244 A1    12/2005
EP    2605922 B    9/2014
(Continued)

OTHER PUBLICATIONS

European Patent Office, International Search Report for related International Application PCT/EP2016/071166, dated Dec. 7, 2016.

*Primary Examiner* — Kip T Kotter

(57) ABSTRACT

A wheel provided with a tire in tire installation in which an outer ground engaging tire is mounted on a rim of the wheel and an inner inflatable member is mounted on the rim inside the outer tire. The inner surface of the outer tire and the outer surface of the inner inflatable member are provided with respective electrically conductive members suitably in the form of induction loops. A controller determines when the respective electrically conductive members come into close proximity or contact, enabling manual or automated adjustment of air pressure to minimize abrasion between the outer tire and inner inflatable member.

6 Claims, 2 Drawing Sheets

(51) Int. Cl.
*B60C 5/22* (2006.01)
*B60C 29/00* (2006.01)

(52) U.S. Cl.
CPC .......... *B60C 29/007* (2013.01); *B60C 23/003* (2013.01); *B60C 2200/08* (2013.01)

(58) Field of Classification Search
USPC .............................. 152/152.1, 339.1, 340.1
See application file for complete search history.

(56) References Cited

U.S. PATENT DOCUMENTS

| | | | | |
|---|---|---|---|---|
| 2009/0020201 | A1* | 1/2009 | Ohara | B60C 5/22 152/340.1 |
| 2011/0073231 | A1* | 3/2011 | Kouno | B60C 17/01 152/519 |
| 2016/0332486 | A1* | 11/2016 | Strashny | B60C 17/01 |

FOREIGN PATENT DOCUMENTS

| | | |
|---|---|---|
| FR | 2579142 A1 | 9/1986 |
| JP | H0781337 A1 | 3/1995 |
| WO | 2009/040831 A1 | 4/2009 |

\* cited by examiner

TYRE IN TYRE SYSTEMS

BACKGROUND OF THE INVENTION

Field of Invention

This invention relates to tyre in tyre systems in which a wheel is provided with an outer ground engaging tyre mounted on a rim of the wheel and an inner inflatable member is mounted on the rim inside the outer tyre, the wheel rim having a first inflation valve mounted on the rim to introduce air into and release air from the inner inflatable member, and a second inflation valve mounted on the rim for introducing air into and releasing air from the interior of the ground engaging tyre external to the inner inflatable member.

Description of Related Art

Such tyre in tyre systems are well known (see, for example, U.S. Pat. No. 7,219,540 and the present applicants European patent EP-B-2605922) as a convenient arrangement to allow the tyre pressures of large tyres, such as those used on agricultural tractors, to be relatively easily changed between the relatively low pressures of say 0.8 bar used when undertaking field work to the higher pressures of say 2 bar used on road work. These systems speed up the changing of the effective tyre pressure as often only the pressure of the volume external to the inner inflatable member needs to be changed to achieve the required effective tyre pressure. This significantly reduces the volume of air which must be pumped in or vented.

The ability to relatively easily and speedily change between field and road pressures is becoming increasingly important as it is necessary to operate the tractor as economically and safely as possible which requires the use of the appropriate tyre pressure at all times. Care must be taken to avoid contact between the inner inflatable member and the outer tyre which can result in abrasion and damage to both and is a particular risk when operating at relatively low pressures during field work.

It is an object of the present invention to provide a wheel with a tyre in tyre system which addresses at least some of the above issues.

OVERVIEW OF THE INVENTION

Thus according to a first aspect of the present invention there is provided a wheel provided with a tyre in tyre installation in which an outer ground engaging tyre is mounted on a rim of the wheel and an inner inflatable member is mounted on the rim inside the outer tyre, the wheel rim having a first inflation means mounted on the rim to introduce air into and release air from the inner inflatable member, and a second inflation means mounted on the rim for introducing air into and releasing air from the interior of the ground engaging tyre external to the inner inflatable member, wherein the inner surface of the outer tyre and the outer surface of the inner inflatable member are provided with respective electrically conductive members and means are provided to determine when the respective electrically conductive members come into close proximity or contact. The electrically conductive members may comprise a pair of switch contacts identifying when contact between the inner member and outer tyre occurs. Alternately, with a view to preventing contact, at least one of the electrically conductive members may comprise an induction loop and the means provided to determine when the respective electrically conductive members come into close proximity or contact include a tuned source feeding the loop and a detector for induced eddy current.

The present invention further comprises a vehicle including such a wheel. The vehicle may include means (such as an audible and/or visual indicator) to alert a user to a determined close proximity or contact between the electrically conductive members. Preferably, the vehicle includes a pressurised air source controllably connectable to the first and second inflation means, and a controller coupled to the air source and providing the means to determine when the respective electrically conductive members come into close proximity or contact, the controller being arranged to automatically adjust the differential air pressure between the inner inflatable member and the interior of the outer tyre. In such an arrangement, the controller may adjust the differential air pressure by increasing the pressure within the outer tyre outside of the inner inflatable member and/or reducing the pressure within the inner inflatable member. Preferably, the vehicle may include a tuner operable to vary the spacing at which close proximity is determined.

BRIEF DESCRIPTION OF THE DRAWINGS

The present invention will now be described, by way of example only, with reference to the accompanying drawings in which.

DETAILED DESCRIPTION OF THE INVENTION

Figure 1:
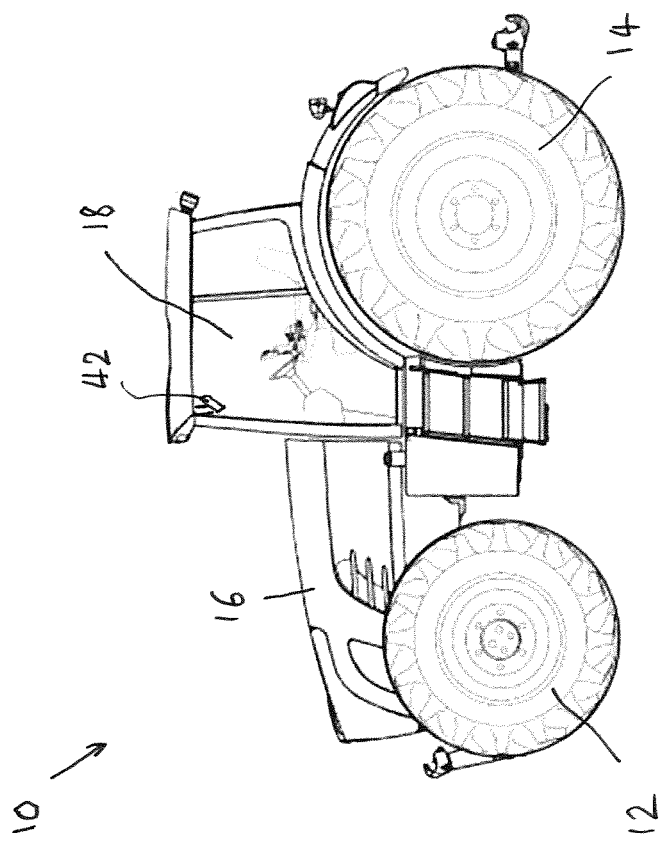
FIG. 1 is a representation of a tractor including a tyre in tyre installation.

FIG. 1 shows an agricultural vehicle, in the form of a tractor 10, having front wheels 12, rear wheels 14, an engine cover 16 and operator cab 18.

Figure 2:
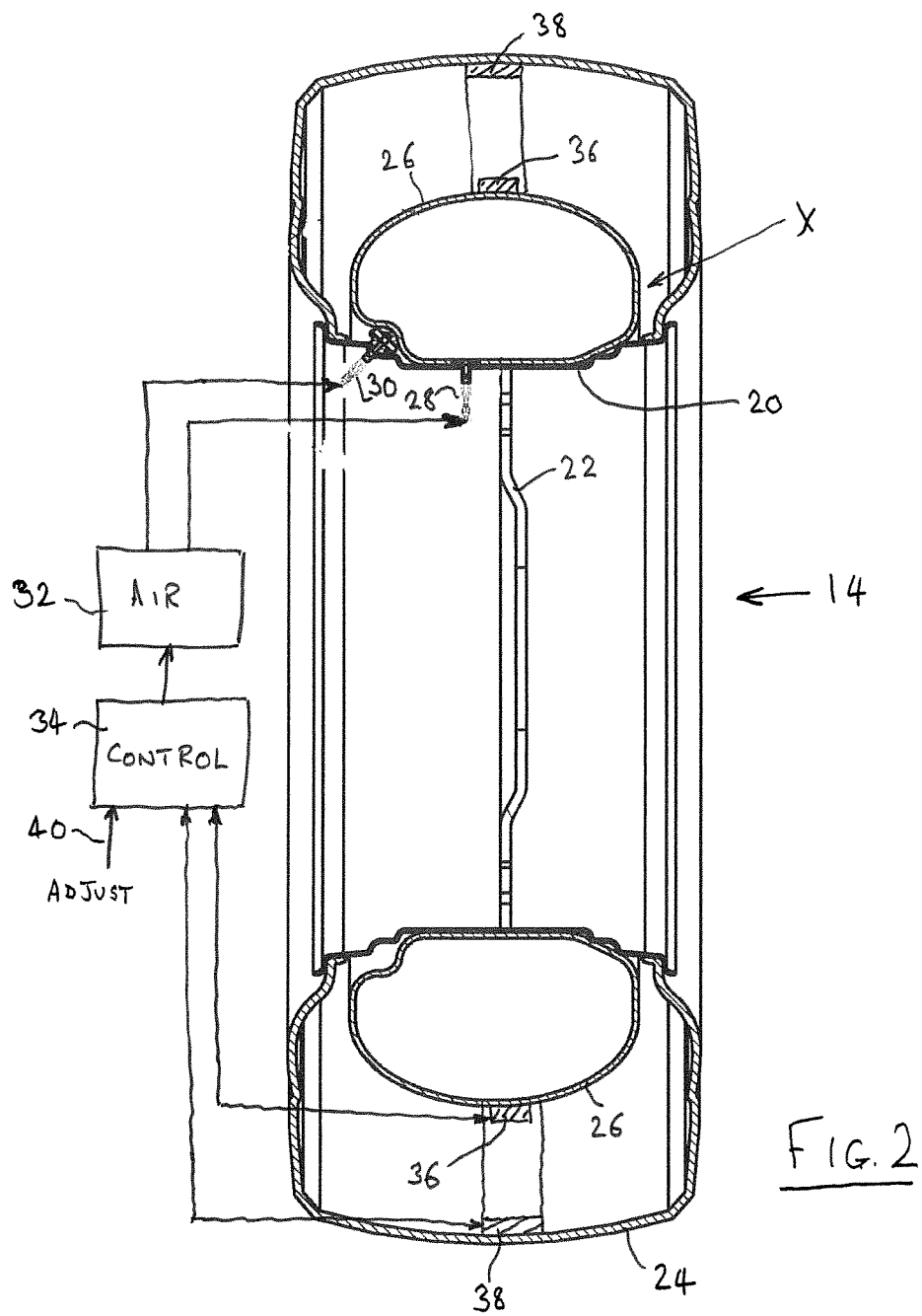
FIG. 2 shows a section through a wheel having a tyre in tyre installation in accordance with the present invention.

FIG. 2 shows the tractor wheel 14 having a rim 20 and a disc 22. A ground engaging tyre 24 is mounted on the rim and an inner inflatable member 26 is mounted inside tyre 24 in the well of the rim. A first inflation valve 28 is provided to introduce air into and release air from within the inner inflatable member 26 and a second inflation valve 30 is provided to introduce air into and release air from within the interior of the ground engaging tyre external to the inner inflation member. Different configurations of inflation valve 28, 30 are described in detail in applicants above-mentioned European patent EP-B-2605922.

This is a so-called tyre in tyre installation which is a convenient arrangement to allow the tyre pressures of large tyres, such as those used on agricultural tractors, to be relatively easily changed between the relatively low pressures of say 0.8 bar used when undertaking field work to the higher pressures of say 2 bar used on road work. These tyre in tyre arrangements speed up the changing of the effective tyre pressure as it is often only necessary to change the pressure of the volume external to the inner inflatable member in order to achieve the desired operating pressure which significantly reduces the volume of air which must be pumped in or vented from within the ground engaging tyre.

A pressurised air supply 32 is controllably connectable to the first 28 and second 30 inflation valves under direction of a controller 34, which controller 34 is suitably a processor-based programmable device which may be a stand-alone unit (as schematically represented in FIG. 2) or it may comprise part of the control system of the tractor 10.

Extending around the outer surface of the inner inflatable member 26 a first electrically conductive member 36 is mounted. Extending around the inner surface of the outer ground engaging tyre 24 a second electrically conductive member 38 is mounted. The two electrically conductive members 36, 38 are connected with the controller 34 which provides a means to determine when the respective electrically conductive members come into contact indicating that the pressure differential between the interior of the inner inflatable member 26 and the interior of the tyre 24 outside of the inner member needs altering. Depending on current pressure levels when contact is detected, the air-gap between the conductive members 36, 38 may be re-established by reducing the air pressure within the inner member 26 or increasing the air pressure within the outer tyre 24 outside of the inner member, or some combination of both.

The material of the conductive members 36, 38 is not critical, but is preferably of a lattice or mesh construction capable of maintaining conductive integrity as the inner member and outer tyre expand, contract and flex. Although shown in FIG. 2 as annular rings generally coplanar with the disc 22 of the wheel 14, it will be recognised that the conductive members 36, 38 may be positioned elsewhere within the space between inner member and outer tyre (for example as indicated at X in FIG. 2) and still perform the function of identifying contact between them.

In a preferred arrangement, at least one (and suitably both) of the conductive members 36, 38 are formed as induction loops supplied with energy from the controller 34, which controller provides both a tuned source and a detector for inductance variations. The use of one or more induction loops has an added benefit in that inductance variation may be detected when the outer surface of the inner member 26 and the inner surface of the outer tyre 24 are in close proximity rather than in physical contact. The controller 34 suitably includes a tuner control or adjustment input 40 by means of which the spacing at which close proximity detection occurs may be varied.

Capacitive sensor arrangements may also be used.

On detection of actual or potential (close proximity) contact, the controller 34 may trigger a warning to the user, for example by means of a light or buzzer 42 within the cab 18, indicating that the tyre pressures need adjustment. Alternately, the controller 34 may be programmed to act automatically to cause the pressurised air supply 32 and valves 28, 30 to make a predetermined adjustment.

In the foregoing the applicants have described a wheel 14 provided with a tyre in tyre installation in which an outer ground engaging tyre 24 is mounted on a rim 20 of the wheel and an inner inflatable member 26 is mounted on the rim inside the outer tyre. The inner surface of the outer tyre 24 and the outer surface of the inner inflatable member 26 are provided with respective electrically conductive members 38, 36 suitably in the form of induction loops. A controller 34 determines when the respective electrically conductive members 38, 36 come into close proximity or contact, enabling manual or automated adjustment of air pressure to minimise abrasion between the outer tyre 24 and inner inflatable member 26.

From reading of the present disclosure, other modifications will be apparent to those skilled in the art. Such modifications may involve other features which are already known in the field of vehicle wheels and component parts therefore and which may be used instead of or in addition to features described herein.

The invention claimed is:

1. A wheel provided with a tyre in tyre installation in which an outer ground engaging tyre is mounted on a rim of the wheel and an inner inflatable member is mounted on the rim inside the outer tyre, the wheel rim having a first inflation device mounted on the rim to introduce air into and release air from the inner inflatable member, and a second inflation device mounted on the rim for introducing air into and releasing air from the interior of the ground engaging tyre external to the inner inflatable member, the wheel being configured such that an inner surface of the outer tyre and an outer surface of the inner inflatable member are provided with respective electrically conductive members and a detection device is provided to determine when the respective electrically conductive members come into close proximity or contact, and wherein at least one of the electrically conductive members comprises an induction loop and the detection device is provided to determine when the respective electrically conductive members come into close proximity or contact include a tuned source feeding the loop and a detector for inductance variation.

2. A vehicle including the wheel as claimed in claim 1.

3. The vehicle as claimed in claim 2 including an indicator configured to alert users to a determined close proximity or contact between the electrically conductive members.

4. The vehicle as claimed in claim 2 including a pressurised air source controllably connectable to the first and second inflation devices, and a controller coupled to the air source and providing the detection device to determine when the respective electrically conductive members come into close proximity or contact, the controller being arranged to automatically adjust the differential air pressure between the inner inflatable member and the interior of the outer tyre.

5. The vehicle as claimed in claim 4 in which the controller adjusts the differential air pressure by at least one of increasing the pressure within the outer tyre outside of the inner inflatable member and reducing the pressure within the inner inflatable member.

6. The vehicle as claimed in claim 4 including a tuner operable to vary the spacing at which close proximity is determined.

* * * * *